United States Patent
Overkamp et al.

(10) Patent No.: US 6,976,151 B1
(45) Date of Patent: Dec. 13, 2005

(54) DECODING AN INSTRUCTION PORTION AND FORWARDING PART OF THE PORTION TO A FIRST DESTINATION, RE-ENCODING A DIFFERENT PART OF THE PORTION AND FORWARDING TO A SECOND DESTINATION

(75) Inventors: Gregory A. Overkamp, Austin, TX (US); Charles P. Roth, Austin, TX (US); Ravi P. Singh, Austin, TX (US)

(73) Assignees: Intel Corporation, Santa Clara, CA (US); Analog Devices, Inc., Norwood, MA (US)

(*) Notice: Subject to any disclaimer, the term of this patent is extended or adjusted under 35 U.S.C. 154(b) by 723 days.

(21) Appl. No.: 09/675,816

(22) Filed: Sep. 28, 2000

(51) Int. Cl.[7] ............................................. G06F 9/30
(52) U.S. Cl. ................................................. 712/209
(58) Field of Search ............................... 712/208, 209

(56) References Cited

U.S. PATENT DOCUMENTS 5,619,408 A * 4/1997 Black et al. ............... 712/226
6,138,232 A * 10/2000 Shiell et al. ............... 712/244

OTHER PUBLICATIONS

John L. Hennessy and David A. Patterson, "Computer Organization and Design, The hardware/software interface", 1998, Morgan Kaufmann Publishers, Inc., Second Edition, p. 414.*

* cited by examiner

*Primary Examiner*—Eddie Chan
*Assistant Examiner*—Tonia L. Meonske
(74) *Attorney, Agent, or Firm*—Fish & Richardson P.C.

(57) ABSTRACT

In one embodiment, a processor receives coded instructions and converts the instructions to a second code prior to execution. The processor may be a digital signal processor. A decoder in the processor determines the destination of the instructions and performs decoding functions based on the destination.

15 Claims, 4 Drawing Sheets

DECODING AN INSTRUCTION PORTION AND FORWARDING PART OF THE PORTION TO A FIRST DESTINATION, RE-ENCODING A DIFFERENT PART OF THE PORTION AND FORWARDING TO A SECOND DESTINATION

TECHNICAL FIELD

This invention relates to digital signal processors, and more particularly to re-encoding instructions within a digital signal processor.

BACKGROUND

Digital signal processing is concerned with the representation of signals in digital form and the transformation or processing of such signal representation using numerical computation. Digital signal processing is a core technology for many of today's high technology products in fields such as wireless communications, networking, and multimedia. One reason for the prevalence of digital signal processing technology has been the development of low cost, powerful digital signal processors (DSPs) that provide engineers the reliable computing capability to implement these products cheaply and efficiently. Since the development of the first DSPs, DSP architecture and design have evolved to the point where even sophisticated real-time processing of video-rate sequences may be performed.

DSPs are often used for a variety of multimedia applications such as digital video, imaging, and audio. DSPs may manipulate the digital signals to create and open such multimedia files.

MPEG-1 (Motion Picture Expert Group), MPEG-2, MPEG-4 and H.263 are digital video compression standards and file formats. These standards achieve a high compression rate of the digital video signals by storing mostly changes from one video frame to another, instead of storing each entire frame. The video information may then be further compressed using a number of different techniques.

The DSP may be used to perform various operations on the video information during compression. These operations may include motion search and spatial interpolation algorithms. The primary intention is to measure distortion between blocks within adjacent frames. These operations are computationally intensive and may require high data throughput.

The MPEG family of standards is evolving to keep pace with the increasing bandwidth requirements of multimedia applications and files. Each new version of the standard presents more sophisticated algorithms that place even greater processing requirements on the DSPs used in MPEG compliant video processing equipment.

Video processing equipment manufacturers often rely on application-specific integrated circuits (ASICs) customized for video encoding under the MPEG and H.263 standards. However, ASICs are complex to design, costly to produce and less flexible in their application than general-purpose DSPs.

DESCRIPTION OF DRAWINGS

These and other features and advantages of the invention will become more apparent upon reading the following detailed description and upon reference to the accompanying drawings.

DETAILED DESCRIPTION

Figure 1:
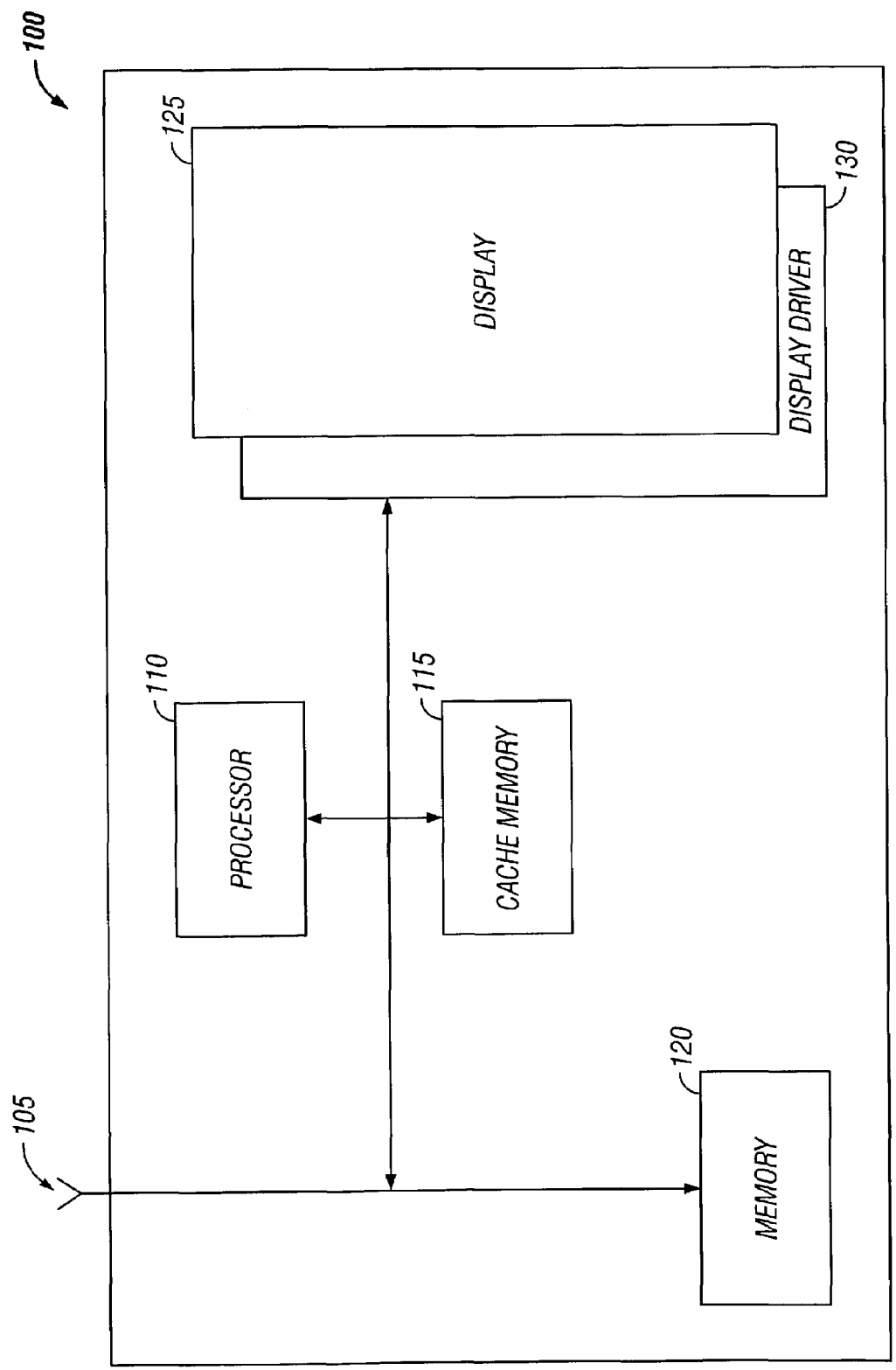
FIG. 1 is a block diagram of a mobile video device utilizing a processor according to one embodiment of the present invention.

FIG. 1 illustrates a mobile video device 100 including a processor according to an embodiment of the invention. The mobile video device 100 may be a hand-held device which displays video images produced from an encoded video signal received from an antenna 105 or a digital video storage medium 120, e.g., a digital video disc (DVD) or a memory card. A processor 110 communicates with a cache memory 115 which may store instructions and data for the processor operations. The processor 110 may be a microprocessor, a digital signal processor (DSP), a microprocessor controlling a slave DSP, or a processor with an hybrid microprocessor/DSP architecture. For the purposes of this application, the processor 110 will be referred to hereinafter as a DSP 110.

The DSP 110 may perform various operations on the encoded video signal, including, for example, analog-to-digital conversion, demodulation, filtering, data recovery, and decoding. The DSP 110 may decode the compressed digital video signal according to one of various digital video compression standards such as the MPEG-family of standards and the H.263 standard. The decoded video signal may then be input to a display driver 130 to produce the video image on a display 125.

Hand-held devices generally have limited power supplies. Also, video decoding operations are computationally intensive. Accordingly, a processor for use in such a device is advantageously a relatively high speed, low power device.

The DSP 110 may have a deeply pipelined, load/store architecture. By employing pipelining, the performance of the DSP may be enhanced relative to a non-pipelined DSP. Instead of fetching a first instruction, executing the first instruction, and then fetching a second instruction, a pipelined DSP 110 fetches the second instruction concurrently with execution of the first instruction, thereby improving instruction throughput. Further, the clock cycle of a pipelined DSP may be shorter than that of a non-pipelined DSP, in which the instruction must be fetched and executed in the same clock cycle.

Such a DSP 110 may be used with video camcorders, teleconferencing, PC video cards, and High-Definition Television (HDTV). In addition, the DSP 110 may also be used in connection with other technologies utilizing digital signal processing such as voice processing used in mobile telephony, speech recognition, and other applications.

Figure 2:
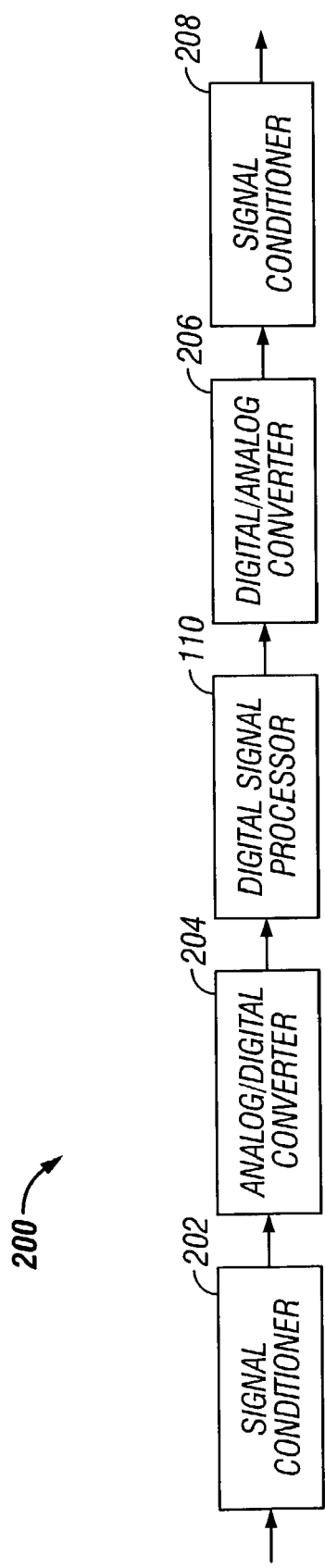
FIG. 2 is a block diagram of a signal processing system according to an embodiment of the present invention.

Turning now to FIG. 2, a block diagram of a signal processing system 200 including DSP 110 according to an embodiment is shown. One or more analog signals may be provided by an external source, e.g., antenna 105, to a signal conditioner 202. Signal conditioner 202 may perform certain preprocessing functions upon the analog signals. Exemplary preprocessing functions may include mixing several of the analog signals together, filtering, amplifying, etc. An analog-to-digital converter (ADC) 204 may be coupled to receive the preprocessed analog signals from signal conditioner 202 and to convert the preprocessed analog signals to digital signals consisting of samples, as described above. The samples may be taken according to a sampling rate determined by the nature of the analog signals received by signal conditioner 202. The DSP 110 may be coupled to receive digital signals at the output of the ADC 204. The DSP 110 may perform the desired signal transformation upon the received digital signals, producing one or more output digital signals. A digital-to-analog converter (DAC) 206 may be coupled to receive the output digital signals from the DSP 110. The DAC 206 converts the output digital signals into output analog signals. The output analog signals may then be conveyed to another signal conditioner 208. The signal conditioner 208 performs post-processing functions upon the output analog signals. Exemplary post-processing functions are similar to the preprocessing functions listed above. It is noted that various alternatives of the signal conditioners 202 and 208, the ADC 204, and the DAC 206 are well known. Any suitable arrangement of these devices may be coupled into a signal processing system 200 with the DSP 110.

Figure 3:
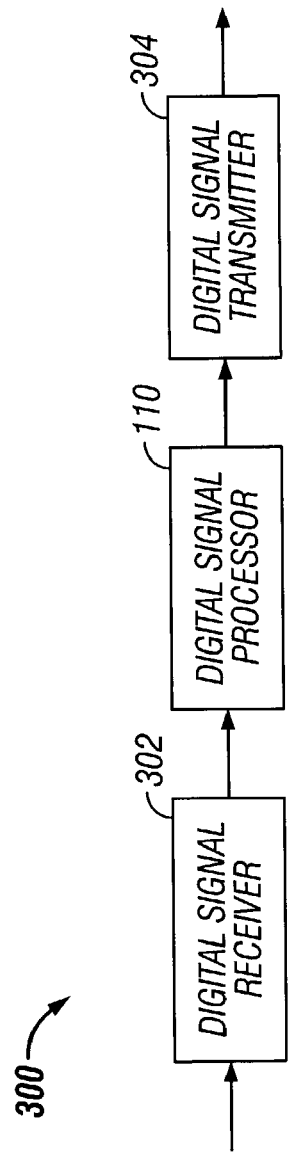
FIG. 3 is a block diagram of an alternative signal processing system according to an embodiment of the present invention.

Turning next to FIG. 3, a signal processing system 300 according to another embodiment is shown. In this embodiment, a digital receiver 302 may be arranged to receive one or more digital signals and to convey the received digital signals to the DSP 110. As with the embodiment shown in FIG. 2, DSP 110 may perform the desired signal transformation upon the received digital signals to produce one or more output digital signals. Coupled to receive the output digital signals is a digital signal transmitter 304. In one exemplary application, the signal processing system 300 is a digital audio device in which the digital receiver 302 conveys to the DSP 110 digital signals indicative of data stored on the digital storage device 120. The DSP 110 then processes the digital signals and conveys the resulting output digital signals to the digital transmitter 304. The digital transmitter 304 then causes values of the output digital signals to be transmitted to the display driver 130 to produce a video image on the display 125.

Figure 4:
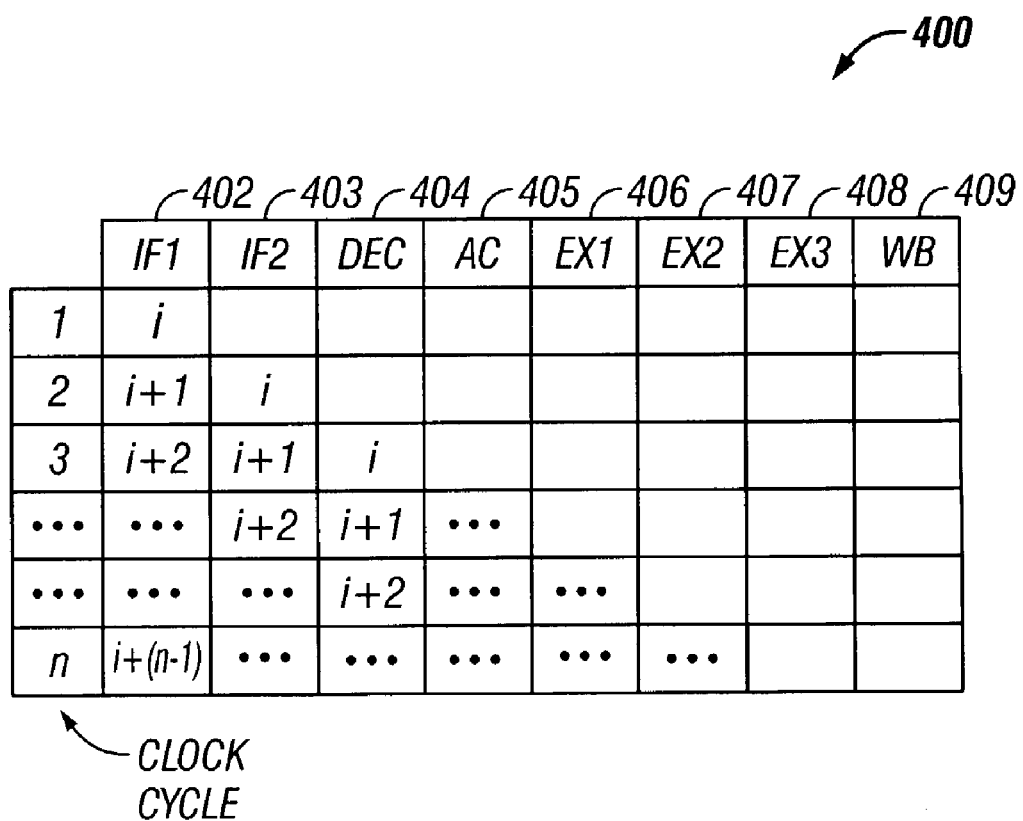
FIG. 4 illustrates exemplary pipeline stages of the processor in FIG. 1 according to an embodiment of the present invention.

The pipeline illustrated in FIG. 4 includes eight stages, which may include instruction fetch 402–403, decode 404, address calculation 405, execution 406–408, and write-back 409 stages. An instruction i may be fetched in one clock cycle and then operated on and executed in the pipeline in subsequent clock cycles concurrently with the fetching of new instructions, e.g., i+1 and i+2.

Pipelining may introduce additional coordination problems and hazards to processor performance. Jumps in the program flow may create empty slots, or "bubbles," in the pipeline. Situations which cause a conditional branch to be taken or an exception or interrupt to be generated may alter the sequential flow of instructions. After such an occurrence, a new instruction may be fetched outside of the sequential program flow, making the remaining instructions in the pipeline irrelevant. Methods such as data forwarding, branch prediction, and associating valid bits with instruction addresses in the pipeline may be employed to deal with these complexities.

Figure 5:
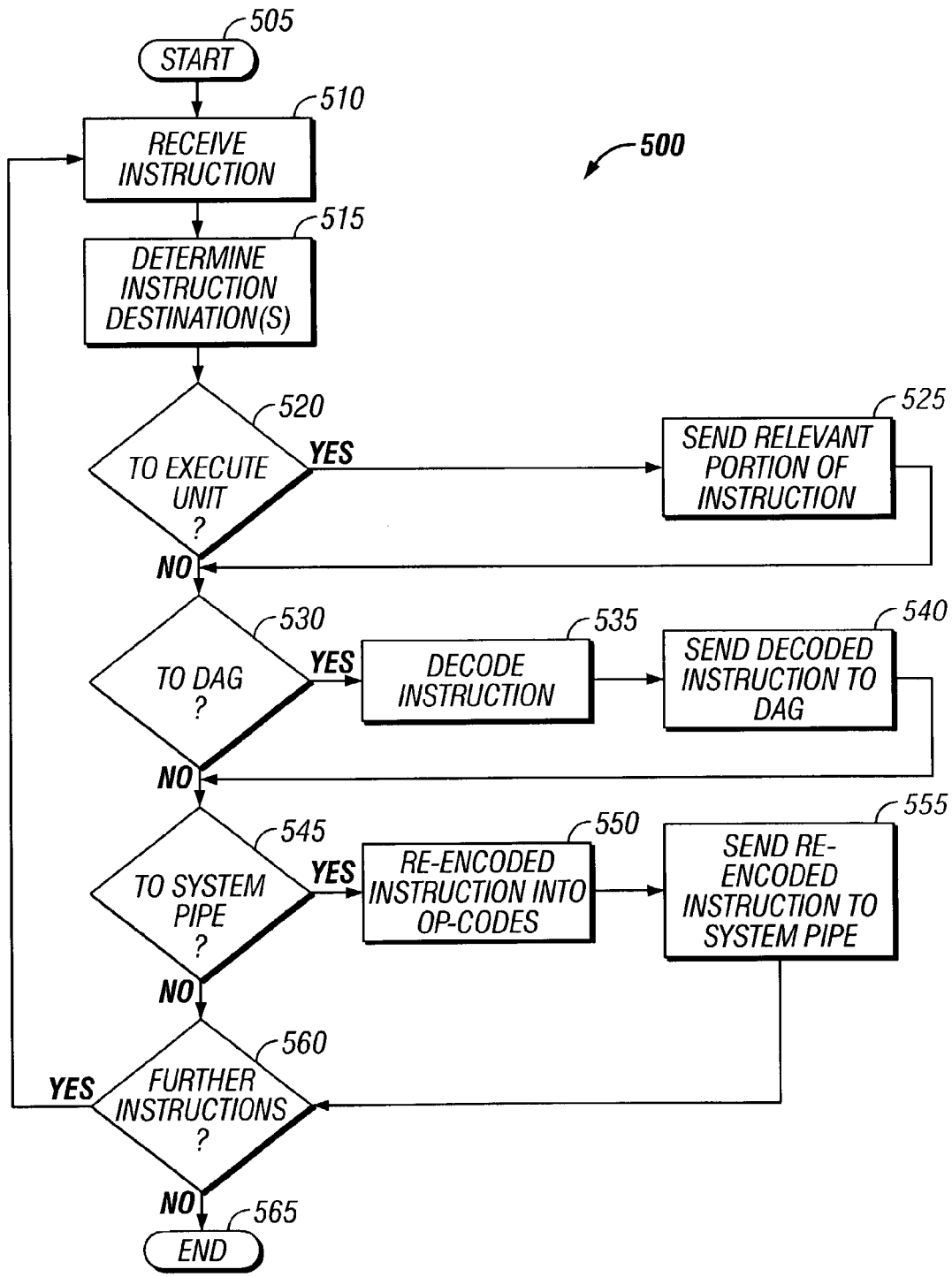
FIG. 5 illustrates a procedure used to process an instruction in a processor according to one embodiment of the present invention.

FIG. 5 illustrates a procedure 500 used to handle an instruction in a processor according to one embodiment of the present invention. The procedure 500 illustrated in FIG. 5 occurs in a single clock cycle. The procedure 500 illustrated in FIG. 5 may be performed in any order, and the following description is simply one embodiment of implementing the procedure 500. In other embodiments, blocks may be skipped or performed in a different order. For example, in an alternative embodiment, an instruction may be re-encoded immediately after determining that is to be sent to the system pipe.

In the illustrated embodiment, the procedure 500 begins at start block 505. Proceeding to block 510, the processor 110 receives an instruction during one of the instruction fetch stages of the pipeline as described above. In one embodiment of the invention, the instruction may be 16-bits, 32-bits, 64-bits in size, or may include multiple instructions contained within a single instruction block. For example, a 64-bit instruction block may include a 32-bit instruction and two 16-bit instructions.

Proceeding to block 515, the instruction is transferred to the decoder and the destination(s) of the instruction is determined. The instruction is typically divided into a plurality of fields, with one of the fields including information on the destination(s) of the instruction. The instruction may be sent to a variety of functional units, including the execute unit, the data address generator (DAG), and the system pipe.

Proceeding to block 520, the procedure 500 examines the destination(s) of the instruction to determine if the instruction is to be sent to the execute unit. The execute unit is able to interpret the instruction directly without any decoding by the decoder. The procedure 500 may also determine that only a portion of the instruction is to be sent to the execute unit. If all or part of the instruction is to be sent to the execute unit, the procedure 500 proceeds along the YES branch to block 525. In block 525, the relevant portion of the instruction as determined in block 520 is directly transferred to the execute unit, without any decoding by the decoder. However, the decoder may send information to the execute unit indicating an execute unit instruction is being delivered.

Returning to block 520, if the instruction is not to be sent to the execute unit, or after transferring a portion of the instruction to the execution unit in block 525, the procedure 500 proceeds along the NO branch to block 530. In block 530, the processor 110 may determine if the any portion of the instruction is to be sent to the data address generator (DAG). If the instructions are to be sent to the DAG, the procedure 500 proceeds along the YES branch to block 535. In block 535, the decoder decodes the instruction. The decoder may decode the entire instruction, or the decoder may decode only a portion of the instruction to be used.

Proceeding to block 540, the decoded instructions are sent to the DAG. For example, the DAG includes registers which may be modified by the instructions. The decoder decodes the instructions and sends a signal to the DAG instructing the DAG how to modify the registers. Thus, the decoder may provide control signals to select registers and perform logical functions such as increment and/or decrement the selected registers in the DAG.

Returning to block 535, if the instructions are not to be sent to the DAG, or after sending the decoded instructions to the DAG in block 540, the procedure 500 proceeds along the NO branch to block 545. In block 545, the processor 110 may determine if the any portion of the instruction is to be sent to the system pipe. If the instructions are to be sent to the system pipe, the procedure 500 proceeds along the YES branch to block 550. In block 550, the decoded instructions are re-encoded into op-codes or some other type of codes. The op-codes may be specific to a particular bus system and may be defined by the processor 110. The op-codes may represent decoded and re-encoded control fields. Of course, other types of signals other than op-codes may be created.

Further, if only a portion of the instructions are needed, only these portions may be re-encoded.

Proceeding to block 555, the re-encoded instructions (op-codes) are sent to the system pipe. The system pipe may interpret and decode the op-codes. By re-encoding the control fields, a processor 110 may operate using a proprietary set of codes regardless of the instructions received by the processor 110. Re-encoding also allows the number of wires necessary on the processor 110 to be decreased. Reducing the number of wires required reduces the size and decreases the power requirement of the processor 110. In this case, the decoder provides the translation between the code sets.

Returning to block 545, if there are no portions of the instructions to transfer to the system pipe, or following the transfer of the codes in block 555, the procedure proceeds to block 560. In block 560, the processor 110 determines if additional instructions are present. If there are additional instructions to be processed, the procedure 500 proceeds along the YES branch back to block 510 where the next instruction is received during an instruction fetch stage. If no additional instructions are present, the procedure 500 proceeds along the NO branch of block 560 to terminate at the end block 565.

As stated above, the entire procedure 500 is performed in a single clock cycle. Additionally, a single instruction may be divided and portions of the instruction sent to a plurality of functional units. For example, a first portion of an instruction may be sent to the execute unit, a second portion of the instruction may be sent to the DAG, and a third portion of the instruction may be sent to the system pipe.

Numerous variations and modifications of the invention will become readily apparent to those skilled in the art. Accordingly, the invention may be embodied in other specific forms without departing from its spirit or essential characteristics.

What is claimed is:

1. A method of handling instructions within a processor comprising:
    decoding at least a portion of an instruction to determine a first destination and a second destination of the instruction;
    re-encoding only a portion of said decoded portion of the instruction to a second re-encoded code used for said first destination and forwarding the re-encoded instruction to said first destination; and
    forwarding a different portion of said decoded portion of the instruction, without re-encoding, to said second destination.

2. The method of claim 1, wherein said first destination is a first functional unit which operates based on op codes.

3. The method of claim 2, further comprising sending at least a portion of the decoded instruction to a second functional unit which operates based on decoded information.

4. The method of claim 1, further comprising determining a portion of the coded instruction to decode.

5. The method of claim 1, further comprising handling instructions in a digital signal processor.

6. A method of processing instructions within a processor comprising:
    receiving a coded processor instruction;
    determining a first functional unit which operates based on coded instructions, a second functional unit which operates based on decoded information obtained from the coded instruction, and a third functional unit, which each receive parts of the instruction;
    forwarding a first portion of the coded instruction having a first destination location representing the first functional unit, to the first functional unit;
    decoding another portion of the instruction;
    forwarding said another portion of the decoded instruction having a second destination location representing the second functional unit, to the second functional unit;
    re-encoding only the remaining portion of the instruction to a second code; and
    forwarding the re-encoded instruction to a third location representing the third functional unit.

7. The method of claim 6, wherein said second functional unit is a data address generator.

8. The method of claim 6, wherein the third functional unit is a system pipe.

9. The method of claim 6, further comprising processing instructions within a digital signal processor.

10. The method of claim 6, further comprising decoding and re-encoding with a decoder.

11. A processor comprising:
    a decoder which receives an instruction coded in a first code and decodes at least a portion of the instruction to form a decoded part and to determine a first destination and a second destination of the instruction and forwards a portion of the instruction to said first destination, which operates based on a decoded code; and
    an encoder which re-encodes only a portion of said decoded portion of the instruction to a second re-encoded code used for said second destination and forwarding said second re-encoded instruction to said second destination.

12. The processor of claim 11, wherein the decoder determines the destination of the instruction.

13. The processor of claim 12, wherein the decoder forwards control signals to other portions of the processor.

14. The processor of claim 13, wherein the control signals may be in the first code or the second code.

15. The processor of claim 11, wherein the processor is a digital signal processor.

* * * * *